(12) United States Patent
Zheng et al.

(10) Patent No.: US 12,130,632 B2
(45) Date of Patent: Oct. 29, 2024

(54) LEGGED ROBOT MOTION CONTROL METHOD, APPARATUS, AND DEVICE, AND STORAGE MEDIUM

(71) Applicant: TENCENT TECHNOLOGY (SHENZHEN) COMPANY LIMITED, Guangdong (CN)

(72) Inventors: Yu Zheng, Guangdong (CN); Xinyang Jiang, Guangdong (CN); Wanchao Chi, Guangdong (CN); Zhengyou Zhang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 245 days.

(21) Appl. No.: 17/945,659

(22) Filed: Sep. 15, 2022

(65) Prior Publication Data

US 2023/0016514 A1    Jan. 19, 2023

Related U.S. Application Data

(63) Continuation of application No. PCT/CN2021/114272, filed on Aug. 24, 2021.

(30) Foreign Application Priority Data

Sep. 7, 2020  (CN) .......................... 202010927483.5

(51) Int. Cl.
  *G05D 1/00*  (2006.01)
  *B62D 57/032* (2006.01)
(52) U.S. Cl.
  CPC ......... *G05D 1/0251* (2013.01); *B62D 57/032* (2013.01)

(58) Field of Classification Search
  CPC .......................... G05D 1/0251; B62D 57/032
  See application file for complete search history.

(56) References Cited

U.S. PATENT DOCUMENTS

| 10,059,392 | B1 | 8/2018 | Fay et al. |
| 2014/0257559 | A1 | 9/2014 | Micaelli |
| 2020/0016750 | A1 | 1/2020 | Swilling |

FOREIGN PATENT DOCUMENTS

| CN | 106826813 A | 6/2017 |
| CN | 107450555 A | 12/2017 |

(Continued)

OTHER PUBLICATIONS

International Search Report for PCT/CN2021/114272 dated, Nov. 10, 2021 (PCT/ISA/210).

(Continued)

*Primary Examiner* — Mathew Franklin Gordon
(74) *Attorney, Agent, or Firm* — Sughrue Mion, PLLC

(57) ABSTRACT

A legged robot motion control method, apparatus, and device, and a storage medium. The method includes: acquiring center of mass state data corresponding to a spatial path starting point and spatial path ending point of a motion path; determining a candidate foothold of each foot in the motion path based on the spatial path starting point and the spatial path ending point; determining a variation relationship between a center of mass position variation coefficient and a foot contact force based on the center of mass state data; screening out, under restrictions of a constraint set, a target center of mass position variation coefficient and target foothold that satisfy the variation relationship; determining a target motion control parameter according to the target center of mass position variation coefficient and the target foothold; and controlling a legged robot based on the target motion control parameter to move according to the motion path.

20 Claims, 5 Drawing Sheets

(56) References Cited

FOREIGN PATENT DOCUMENTS

| CN | 107562052 A | 1/2018 |
| CN | 108237532 A | 7/2018 |
| CN | 108333931 A | 7/2018 |
| CN | 111483532 A | 8/2020 |
| CN | 111506094 A | 8/2020 |
| CN | 111605642 A | 9/2020 |
| CN | 112051797 A | 12/2020 |

OTHER PUBLICATIONS

Written Opinion of the International Searching Authority for PCT/CN2021/114272 dated, Nov. 10, 2021 (PCT/ISA/237).
Extended European Search Report dated Sep. 21, 2023 in European Application No. 21863539.9.
Translation of Written Opinion dated Nov. 10, 2021 in International Application No. PCT/CN2021/114272.
Buchli et al., "Compliant Quadruped Locomotion Over Rough Terrain", IEEE, 2009, pp. 814-820 (7 pages total).

LEGGED ROBOT MOTION CONTROL METHOD, APPARATUS, AND DEVICE, AND STORAGE MEDIUM

CROSS-REFERENCE TO RELATED APPLICATION(S)

This application is a continuation application of International Application No. PCT/CN2021/114272 filed on Aug. 24, 2021, which claims priority to Chinese Patent Application No. 202010927483.5, filed with the China National Intellectual Property Administration on Sep. 7, 2020, the disclosures of which are incorporated by reference in their entireties.

FIELD

The disclosure relates to the field of robot technology, and particularly to a legged robot motion control method, apparatus, and device, and a storage medium.

BACKGROUND

With the constant development of computer, various robots have gradually emerged, such as legged robots. How to control motions of robots is a concern in the field of robots. Before a legged robot is controlled to move, it is necessary to determine a center of mass motion trajectory of the legged robot first, and the legged robot is further controlled according to the center of mass motion trajectory.

In the related art, a center of mass position of a robot is determined according to a kinetic equation for a legged robot. However, in this manner, an actual motion process of the legged robot is not considered. As a result, the determined center of mass position does not conform so well to an actual motion of the legged robot, and the legged robot is difficult to complete the motion process according to this center of mass motion trajectory. That is, the center of mass position generated in the related art is low in adaptability.

SUMMARY

Some embodiments provide a legged robot motion control method, apparatus, and device, and a computer-readable storage medium to improve the adaptability of a generated center of mass position.

Some embodiments may provide a legged robot motion control method, performed by a legged robot motion control device, including: acquiring center of mass state data corresponding to a spatial path starting point and spatial path ending point of a motion path; determining a candidate foothold of each foot in the motion path based on the spatial path starting point and the spatial path ending point; determining a variation relationship between a center of mass position variation coefficient and a foot contact force based on the center of mass state data; screening out, under restrictions of a constraint set, a target center of mass position variation coefficient and target foothold that satisfy the variation relationship, the constraint set including a spatial foothold constraint; determining a target motion control parameter according to the target center of mass position variation coefficient and the target foothold; and controlling a legged robot based on the target motion control parameter to move according to the motion path.

Some embodiments may provide a legged robot motion control apparatus, including: an acquisition module, configured to acquire a center of mass state data corresponding to a spatial path starting point and spatial path ending point of a motion path; a first determination module, configured to determine a candidate foothold of each foot in the motion path based on the spatial path starting point and the spatial path ending point; a second determination module, configured to determine a variation relationship between a center of mass position variation coefficient and a foot contact force based on the center of mass state data; a screening module, configured to screen out, under restrictions of a constraint set, a target center of mass position variation coefficient and target foothold that satisfy the variation relationship, the constraint set including a spatial foothold constraint; a third determination module, configured to determine a target motion control parameter according to the target center of mass position variation coefficient and the target foothold; and a control module, configured to control a legged robot based on the target motion control parameter to move according to the motion path.

Some embodiments may provide a legged robot motion control device, including: a memory; and at least one processor connected with the memory, the memory storing instructions executable by the at least one processor, and the at least one processor executing the instructions stored in the memory to implement the method as described in the foregoing embodiments.

Some embodiments may provide a non-transitory computer-readable storage medium, storing computer instructions, the computer instructions, when run on a computer, enabling the computer to perform the method as described in the foregoing embodiments.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1:
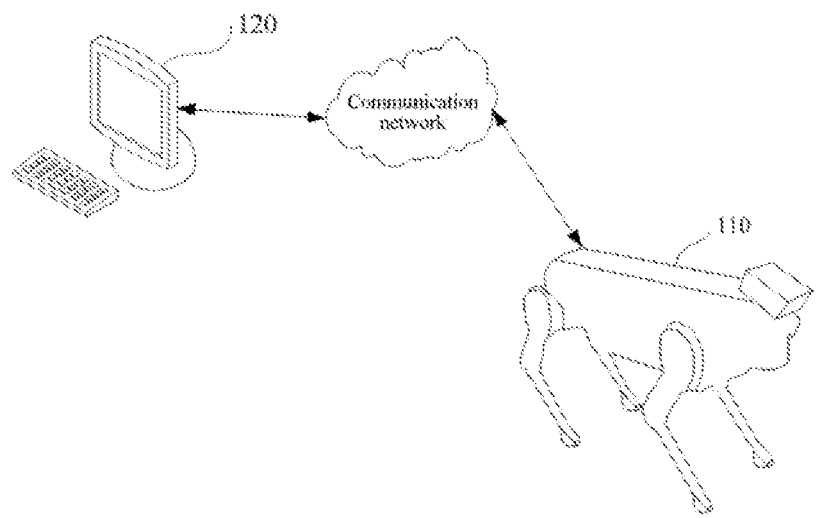
FIG. 1 is an example diagram of an application scenario of a legged robot motion control method according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

For ease of understanding the technical solutions better by those skilled in the art, relevant terms will now be introduced.

Robot: it includes various machines (such as robot dogs and robot cats) that simulate human behaviors or simulate other living creatures in thought. In a broad sense, some computer programs are also referred to as robots. In the contemporary industry, a robot is an artificial robot capable of executing tasks automatically and replacing or assisting humans in their work. It may be an electromechanical device, or is controlled by computer programs or electronic circuits.

Legged robot: it is a general term of robots with feet. A legged robot may be provided with one or more feet, such as two feet, four feet, and six feet. Each foot is correspondingly provided with one or more joints.

Motion path: it is a motion path that the legged robot needs to complete. The motion path has a random length, and no specific limits are made. A movement duration needed by the legged robot to complete the motion path is regarded as a sampling period. The movement duration includes multiple instants. When a center of mass position is actually determined, instants selected from the multiple instants are referred to as sampling instants.

Spatial path starting point: also referred to as a starting position, is where the robot starts motion along the motion path. An instant corresponding to the spatial path starting point may be referred to as a starting instant.

Spatial path ending point: it is where the robot stops motion along the motion path. An instant corresponding to the spatial path ending point may be referred to as an ending instant.

Center of mass state data: it is data for describing a center of mass state variation of the robot, specifically including one or more of a center of mass position, center of mass velocity, or center of mass acceleration of the robot. The center of mass position is a central position of mass of the robot for describing a position of the robot. The center of mass position of the robot varies in different motion states. The center of mass velocity may be obtained by taking a first-order derivative of the center of mass position to a time interval. The center of mass acceleration may be obtained by taking a second-order derivative of the center of mass position to the time interval. For ease of description, a center of mass position corresponding to the spatial path starting point may be referred to as a starting center of mass position, a center of mass velocity at the spatial path starting point may be referred to as a starting center of mass velocity, and a center of mass acceleration at the spatial path starting point may be referred to as a starting center of mass acceleration. Similarly, a center of mass position corresponding to the spatial path ending point may be referred to as an ending center of mass position, a center of mass velocity at the spatial path ending point may be referred to as an ending center of mass velocity, and a center of mass acceleration at the spatial path ending point may be referred to as an ending center of mass acceleration.

Candidate foothold: it is a possible contact position of a foot and a contact surface when the foot of the robot is in contact with the contact surface. For example, at a certain instant, candidate footholds of the robot include three points A, B, and C.

Center of mass position variation coefficient: it is used for describing a center of mass position variation parameter in the course of time. The center of mass position variation coefficient is represented in a matrix form, a vector form, etc. The center of mass position variation coefficient together with the time interval may represent a center of mass position at a specific instant, and the time interval is a time difference between the specific instant and the instant corresponding to the spatial path starting point.

Contact surface: it is a surface where the foot of the robot is in contact with an environment. The contact surface is, for example, the ground, or another support in contact with the foot. Due to the unevenness of the ground and other conditions, multiple feet of the legged robot may correspond to different contact surfaces.

Center of mass motion trajectory: it is also referred to as a center of mass position motion trajectory for describing center of mass positions of the robot at different instants, actually including center of mass positions of the robot at different instants.

Contact point: also referred to as a foot for standing, it is a foot of the robot in contact with the contact surface. The number of feet in contact with the contact surface is the number of contact points. Certainly, feet of the robot in contact with the contact surface at different instants are not completely the same.

Step sequence: it is used for describing a gait of the robot during completion of the motion path, specifically including at least one motion phase during the motion of the robot along the motion path, as well as a duration of each motion phase.

Foot contact force: it is an acting force between the foot of the robot in contact with the contact surface and the contact surface.

Constraint set: it is a relational expression for restricting values of the center of mass position variation coefficient and/or the foothold. The constraint set includes one or more constraints. In some embodiments, the constraint set at least includes a spatial foothold constraint for restricting a foothold of the robot within a workspace of the robot. The spatial foothold constraint is specifically correlated with the center of mass position variation coefficient of the robot.

Target motion control parameter: it is used for controlling a parameter needed by the motion of the legged robot, specifically including a joint angle of the legged robot at any instant, a joint torque at any instant, etc.

In addition, "multiple" refers to two or more, "at least one" refers to one or more, and "A and/or B" specifically includes three conditions: A, B, and A as well as B.

In order to improve the adaptability of a generated center of mass position, a legged robot motion control method is provided. The design concept of the legged robot motion control method will now be introduced.

In some embodiments, multiple candidate footholds corresponding to a foot of a legged robot are determined first. A variation relationship between a center of mass position variation coefficient and a foot contact force is determined according to center of mass state data of the legged robot. A target center of mass position variation coefficient and target foothold of the legged robot are determined based on the multiple candidate footholds by use of the variation relationship and a constraint set. A center of mass motion trajectory of the legged robot is further determined according to the target center of mass position variation coefficient. A target motion control parameter is determined according to the center of mass motion trajectory and the target foothold. The legged robot is controlled based on the target motion control parameter to move along a motion path. In some embodiments, the footholds of the legged robot are restricted within a workspace, so that the determined center of mass position and target foothold both satisfy a spatial foothold constraint, and the adaptability of the determined center of mass position to an actual motion process is improved. In addition, in the method, the center of mass position and the center of mass motion trajectory are generated automatically, and the foothold is selected automatically, so that the legged robot is controlled more automatically.

Further, in some embodiments, quadratic programming may be constructed according to the variation relationship, the constraint set, and a target function, and the target center of mass position variation coefficient and the target foothold are determined by solving the quadratic programming. If there is a solution to a quadratic programming problem, a global optimal solution may be certainly determined. Transforming the determination of the target center of mass position variation coefficient and the target foothold into a quadratic programming problem may find an optimal target center of mass position variation coefficient and target foothold.

Based on the above design concept, an application scenario of the legged robot motion control method according to some embodiments will now be introduced.

The legged robot motion control method is suitable for controlling various gaits of various legged robots in various environments. Various legged robots include, for example, a biped robot and a quadruped robot. Various environments include, for example, a flat ground, an uneven ground, a slope, or stairs. Various gaits include, for example, bipedal walking, quadrupedal walking, quadrupedal running, and a random gait.

FIG. 1 is a diagram of an application scenario of a legged robot motion control method, or understood as an architecture diagram of a legged robot motion control system. The architecture diagram includes a legged robot 110 and a control device 120. The following is an example of an interaction between the control device 120 and the legged robot 110.

In an example embodiments, the control device 120 and the legged robot 110 are two devices independent of each other.

In this scenario, the legged robot 110 performs wired or wireless communication with the control device 120. FIG. 1 takes implementing communication between the legged robot 110 and the control device 120 by use of a communication network as an example.

Before controlling the legged robot 110 to move, the control device 120 may set center of mass state data of the legged robot 110 corresponding to a spatial path starting point and a spatial path ending point according to an operation of a user or a task of the legged robot 110. The legged robot 110 may detect center of mass state data corresponding to a spatial path starting point, and upload the center of mass state data corresponding to the spatial path starting point to the control device 120. Alternatively, the control device 120 directly collects center of mass state data of the legged robot 110 corresponding to a spatial path starting point.

Further, the control device 120 collects a current environmental image of the legged robot 110, or receive an environmental image reported by the legged robot 110. The control device 120 determines a possible candidate foothold of a foot that the legged robot 110 needs to stand on in a motion path according to the environmental image. Certainly, the control device 120 determines the candidate foothold in various manners, which will be specifically introduced below.

The control device 120 determines a center of mass motion trajectory and foothold of the legged robot 110 according to the center of mass state data and the candidate foothold to further control the legged robot 110 to move correspondingly. Contents about the determination of the center of mass motion trajectory and the foothold will be introduced below.

The control device 120 may be implemented by a server or a terminal. The server includes, but not limited to: an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal is, for example, a mobile phone, a personal computer, a smart television, or a portable tablet computer.

In some embodiments, the control device 120 is a part of the legged robot 110.

The control device 120 may be disposed in a body of the legged robot 110. For example, the control device 120 is an internal processor of the legged robot 110.

Before the control device 120 controls the legged robot 110 to move, the control device 120 may receive a motion instruction from an upper computer, or obtain a motion instruction according to an input operation of a user. The motion instruction may instruct the legged robot 110 to execute a certain task, or indicate a spatial path starting point and spatial path ending point in a motion path of the legged robot 110. The upper computer may be any device in wired or wireless communication with the control device 120, such as a terminal or a server.

Similarly, the control device 120 collects center of mass state data of the legged robot 110. The control device 120 may determine a possible candidate foothold of a foot that the legged robot 110 needs to stand on each time according to a current environmental image of the legged robot 110. The control device 120 determines a center of mass motion trajectory and target foothold of the legged robot according to the center of mass state data and the candidate foothold to control the legged robot 110 to move. Contents about the determination of the center of mass motion trajectory and the foothold will be introduced below.

Figure 2:
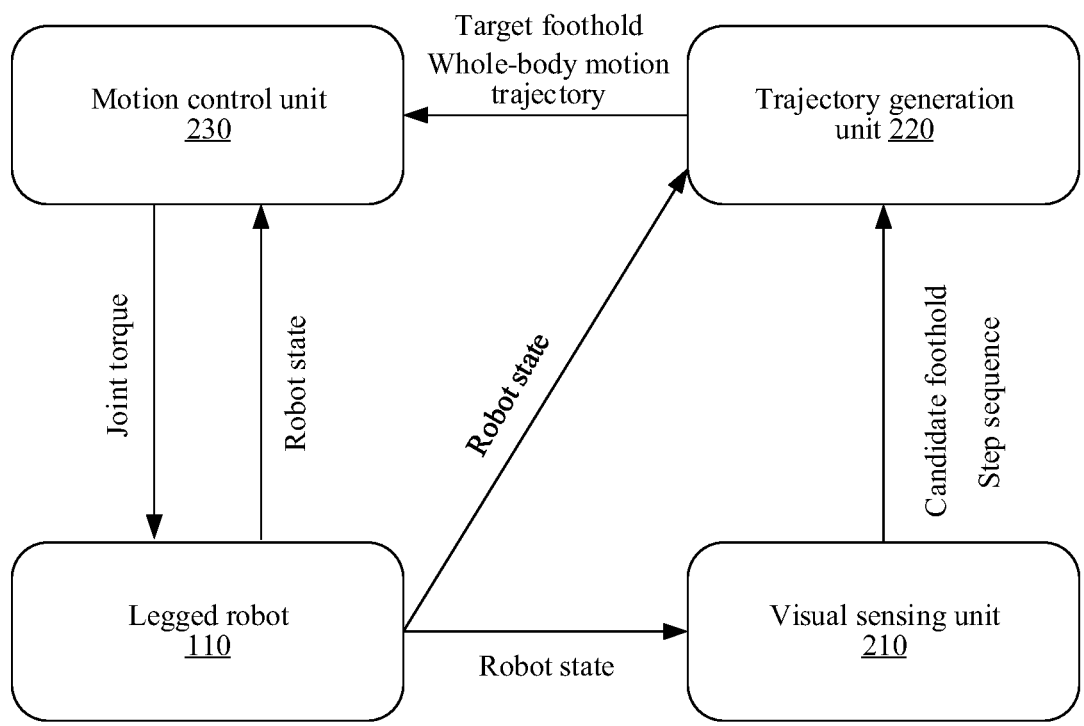
FIG. 2 is an example structural diagram of a control device according to some embodiments.

FIG. 2 provides an example structural diagram of a control device according to some embodiments. FIG. 2 shows the control device 120 including a visual sensing unit 210, a trajectory generation unit 220, and a motion control unit 230 as an example.

The visual sensing unit 210 may be disposed at the legged robot 110, for example, mounted to the head of a legged robot 110. The visual sensing unit 210 is one or more of, for example, a camera and an infrared camera. The camera is, for example, a red, green, blue and depth (RGBD) camera.

The visual sensing unit 210 collects a robot state, including center of mass state data of the legged robot 110 corresponding to a spatial path starting point and a spatial path ending point. In addition, the visual sensing unit 210 may further collect an environmental image of the legged robot 110 to obtain a possible candidate foothold needed by the legged robot 110 to stand each time. Further, a step sequence of the legged robot 110 may be obtained according to a motion path of the legged robot 110, etc.

After obtaining the center of mass state data, the environmental image, and the step sequence, the visual sensing unit 210 may transmit the data to the trajectory generation unit 220.

The trajectory generation unit 220 receives the robot state data, the step sequence, and the candidate foothold, determines center of mass positions and target footholds of the legged robot 110 at multiple instants, and obtains a center of mass motion trajectory of the legged robot 110 according to the center of mass positions at the multiple instants. Further, a whole-body motion trajectory of the legged robot 110 is determined according to the center of mass motion trajectory and the target footholds, and the whole-body motion trajectory and the target footholds are transmitted to the motion control unit 230.

The motion control unit 230 may determine a joint torque of each joint of the legged robot 110 according to the whole-body motion trajectory and the target footholds, and control each joint of the legged robot 110 to rotate according to each joint torque, so as to implement motion of the legged robot 110.

Further, the motion control unit 230 may further monitor a real-time legged robot state during movement of the legged robot 110, so as to ensure stable movement of the legged robot 110.

Based on the above application scenario, the general idea of the motion control method involved in the embodiments will now be introduced.

In some embodiments, a center of mass position of the legged robot 110 at each instant is transformed into a relationship between a center of mass position variation coefficient, a starting center of mass position, and a time interval between this instant and the starting center of mass position. A relationship between a center of mass position and a foot contact force is transformed into a variation relationship between the center of mass position variation coefficient and the foot contact force according to center of mass state data. The center of mass position variation coefficient and a target foothold are further determined based on the variation relationship and a constraint set. Further, a center of mass motion trajectory of the legged robot 110 is obtained according to the center of mass position variation coefficient. A target motion control parameter of the legged robot 110 is determined according to the center of mass motion trajectory and the target foothold. The legged robot 110 is controlled based on the target motion control parameter to move.

Further, when the center of mass position variation coefficient and the target foothold are determined, the problem of determining the center of mass position variation coefficient and the target foothold may be transformed into a mixed integer quadratic programming problem by combining the constraint set and the variation relationship, and the quadratic programming problem is solved to obtain the center of mass position and the target foothold. The variation relationship and the constraint set are pre-configured in the control device 120, or acquired by the control device 120 from another device or a network resource, or created by the control device 120. The following is an example of how the control device 120 creates the variation relationship and the constraint set.

First, the variation relationship is obtained.

The control device 120 may obtain a relational expression between a center of mass position at each instant and a foot contact force at the corresponding instant from a network resource or another device. The meaning of the foot contact force is described above, and will not be elaborated herein. The center of mass position at each instant in the relational expression is represented by a starting center of mass position, a center of mass position variation coefficient, and a time interval together, so as to transform the relational expression between the center of mass position at each instant and the foot contact force at the corresponding instant into a variation relationship between the center of mass position variation coefficient and the foot contact force. The variation relationship is used for representing a variation relationship between the center of mass position variation coefficient and the foot contact force. After obtaining the variation relationship, the control device 120 may store the variation relationship in any form, such as a function form and a descriptive statement form.

The following in an example process of creating the variation relationship by the control device 120.

1: a first relational expression of the legged robot 110 is obtained.

The first relational expression, a center of mass kinetic equation of the legged robot 110, is used for representing a relationship between a motion of the legged robot 110 and an external force thereon. The first relational expression may be represented in various forms, such as a Newton-Euler equation. An example of the first relational expression is as follows:

$$\begin{bmatrix} m(\ddot{p}_G - g) \\ \dot{L} \end{bmatrix} = \sum_{i=1}^{N_c} \begin{bmatrix} I_{3\times 3} \\ \hat{r}_i - \hat{p}_G \end{bmatrix} f_i \qquad (1)$$

where m represents a total mass of the legged robot 110, $g \in R^3$ represents a gravitational acceleration, $p_G \in R^3$ represents a center of mass position of the legged robot 110, $\hat{r}_i \in R^3$ represents a position of an $i^{th}$ contact point of the legged robot 110 and the contact surface, or referred to as a foothold, i.e., a position of a foot in contact with the contact surface, $L \in R^3$ represents a center of mass angular momentum of the legged robot 110, $\dot{L}$ represents taking a first-order derivative of the angular momentum to a time interval, $f_i \in R^3$ represents a foot contact force at the $i^{th}$ contact point, $N_c$ represents the number of contact points, the $\hat{(\,)}$ operation represents a diagonal matrix of ( ), $\ddot{p}_G$ represents taking a second-order derivative of $p_G$ to the time interval, and $R^3$ represents three coordinate values under a coordinate system.

In some embodiments, each quantity is a representation result under a world coordinate system, unless otherwise specified. For example, each variable in formula (1) is a representation result under the world coordinate system.

It is to be noted that the first three rows in formula (1) are obtained according to the Newton's law, and the last three rows are obtained according to the Euler equation.

Further, it can be seen according to the first three rows in formula (1) that:

$$m(\ddot{p}_G - g) = \sum_{i=1}^{N_c} f_i. \quad (2)$$

Formula (2) is typed into formula (1) to obtain the following formula:

$$\begin{bmatrix} m(\ddot{p}_G - g) \\ m\widehat{p_G}(\ddot{p}_G - g) + \dot{L} \end{bmatrix} = \sum_{i=1}^{N_c} \begin{bmatrix} I_{3\times 3} \\ \hat{r}_i \end{bmatrix} f_i = \sum_{i=1}^{N_c} G_i f_i \quad (3)$$

where $G_i = \begin{bmatrix} I_{3\times 3} \\ \hat{r}_i \end{bmatrix}$.

$G_i \in R^{3\times 3}$ may be a 3×3 matrix.

2: a center of mass position at each instant in the first relational expression is represented as a sum of a starting center of mass position and a center of mass position variation after a time interval t, to obtain a second relational expression.

① The center of mass position at each instant is represented as a sum of a center of mass position corresponding to a starting position and the center of mass position variation after the time interval t, specifically as follows:

$$p_G = p^{init} + p_t \quad (4)$$

where $p^{init}$ represents the starting center of mass position, and $p_t$ represents the center of mass position variation after the time interval t.

② Formula (4) is typed into formula (3) to obtain the second relational expression as follows:

$$\sum_{i=1}^{N_c} G_i f_i = m \begin{bmatrix} \ddot{p}_t \\ \overline{p^{init}} \ddot{p}_t + \hat{g} p_t \end{bmatrix} - m \begin{bmatrix} g \\ \overline{p^{init}} g \end{bmatrix} + \begin{bmatrix} 0_{3\times 3} \\ \dot{L} \end{bmatrix} + \begin{bmatrix} 0_{3\times 1} \\ m\hat{p}_t \ddot{p}_t \end{bmatrix} \quad (5)$$

Each term in the second relational expression is analyzed below.

The first term $$m \begin{bmatrix} \ddot{p}_t \\ \overline{p^{init}} \ddot{p}_t + \hat{g} p_t \end{bmatrix}$$

is in a linear relationship with $\ddot{p}_t$ and $p_t$. The second term $$m \begin{bmatrix} g \\ \overline{p^{init}} g \end{bmatrix}$$

is a constant item. There is $\dot{L}$ for the third term $$\begin{bmatrix} 0_{3\times 3} \\ \dot{L} \end{bmatrix}.$$

There is a product of $\hat{p}_t$ and $\ddot{p}_t$ for the fourth term $$\begin{bmatrix} 0_{3\times 1} \\ m\hat{p}_t \ddot{p}_t \end{bmatrix}.$$

As an example, when a body pose of the legged robot 110 changes slightly, $\dot{L}$ is approximately $0_{3\times 1}$. Alternatively, a value of the third term $$\begin{bmatrix} 0_{3\times 3} \\ \dot{L} \end{bmatrix}$$

may be determined according to a pre-configured body pose of the legged robot 110 at each instant.

3: the center of mass position variation in the fourth term $\hat{p}_t \ddot{p}_t$ in the second relational expression is set as a variation in each direction, to obtain a third relational expression:

$$\hat{p}_t \ddot{p}_t = \hat{p}_t{}^{xy} \ddot{p}_t{}^{xy} + \hat{p}_t{}^{xy} \ddot{p}_t{}^z + \hat{p}_t{}^z \ddot{p}_t{}^{xy} + \hat{p}_t{}^z \ddot{p}_t{}^z \quad (6)$$

where $p_t = p_t{}^{xy} + p_t{}^z$, $p_t{}^{xy}$ including an xy-axis component of $p_t$. $\ddot{p}_t{}^{xy}$ represents a second-order derivative of a component of the center of mass position variation $p_t$ on an xy plane to the time interval, as well as a component of a center of mass acceleration on the xy plane. $\ddot{p}_t{}^z$ represents a second-order derivative of a component of the center of mass position variation $p_t$ on a z plane to the time interval, as well as a component of the center of mass acceleration on the z plane.

$\hat{p}_t{}^{xy}$ represents a diagonal matrix of the xy-axis component of the center of mass position variation $p_t$. $\hat{p}_t{}^z$ represents a diagonal matrix of a z-axis component of the center of mass position variation $p_t$.

A z coordinate of $p_t{}^{xy}$ is 0. $p_t{}^z$ includes the z-axis component of $p_t$. x and y coordinates corresponding to $p_t{}^z$ are 0. A z-axis torque is generated as $\hat{p}_t{}^{xy} \ddot{p}_t{}^{xy}$. A torque in a certain direction in the xy plane is $\hat{p}_t{}^{xy} \ddot{p}_t{}^z + \hat{p}_t{}^z \ddot{p}_t{}^{xy}$. Since $\ddot{p}_t{}^z$ is collinear with $\hat{p}_t{}^z$, $\hat{p}_t{}^z \ddot{p}_t{}^z = 0$.

In addition, the motion of the legged robot 110 in the z direction is usually stable, so $\ddot{p}_t{}^z$, $\hat{p}_t{}^z$, and $\hat{p}_t{}^{xy} \ddot{p}_t{}^z + \hat{p}_t{}^z \ddot{p}_t{}^{xy}$ are ignorable. Moreover, $\hat{p}_t{}^{xy}$, $\ddot{p}_t{}^{xy}$, and $\hat{p}_t{}^{xy} \ddot{p}_t{}^{xy}$ have relatively small absolute values, and thus are also ignorable. When the legged robot 110 is actually controlled, a foot acting force between a foot and the contact surface may also be adjusted to obtain the ignored term in formula (6), i.e., the torque involved in formula (6).

As an example, the fifth term in the second relational expression may be ignored to obtain a fourth relational expression:

$$\sum_{i=1}^{N_c} G_i f_i \approx H_0 x_t - w \quad (7)$$

where $$\sum_{i=1}^{N_c} G_i f_i \approx H_0 x_t - w \quad (7)$$

where $$H_0 = m \begin{bmatrix} 0_{3\times 3} & I_{3\times 3} \\ \hat{g} & \overline{p^{init}} \end{bmatrix}, \quad x_t = \begin{bmatrix} p_t \\ \ddot{p}_t \end{bmatrix}, \quad w = \begin{bmatrix} mg \\ m\overline{p^{init}} g - \dot{L} \end{bmatrix},$$

where $H_0$ and $w$ are known quantities, and $x_t$ is a quantity to be determined, including the center of mass position variation $p_t$ and the center of mass acceleration $\ddot{p}_t$.

4: the center of mass position variation is set as an $n^{th}$-order polynomial taking time as an independent variable, specifically as follows:

$$P_t = \begin{bmatrix} T_P & 0_{1\times(n+1)} & 0_{1\times(n+1)} \\ 0_{1\times(n+1)} & T_P & 0_{1\times(n+1)} \\ 0_{1\times(n+1)} & 0_{1\times(n+1)} & T_P \end{bmatrix} \begin{bmatrix} c_{xk} \\ c_{yk} \\ c_{zk} \end{bmatrix} = Tc \quad (8)$$

where $T_P=[1 \; t \; \ldots \; t^n] \in R^{1\times(n+1)}$, $c_*=[c_{*,0} \; c_{*,1} \ldots c_{*,1} \ldots c_{*,n}]^T \in R^{n+1}$ is a polynomial coefficient, t represents the time interval, i.e., a time interval between this instant and an instant corresponding to the spatial path starting point, * represents x, y, and z, and c represents the center of mass position variation coefficient, including all polynomial coefficients. In practical applications, after the center of mass position variation coefficient c is obtained, the center of mass position at each of multiple instants may be calculated according to formula (8).

In an example embodiment, n is valued to any integer greater than or equal to 2.

5: a second-order derivative of formula (8) to the time interval is taken to obtain the center of mass acceleration, and a fifth relational expression is obtained according to the center of mass acceleration and the fourth relational expression.

The center of mass acceleration is specifically represented as follows:

$$\ddot{P}_t = \ddot{T}c \quad (9)$$

Formula (8) and formula (9) are typed into formula (7) to obtain the fifth relational expression:

$$\sum_{i=1}^{N_c} G_i f_i \approx Hc - w \quad (10)$$

where $H=H_0[T^T \; \ddot{T}^T]^T$ is correlated with the time interval t. Formula (10) represents a relationship between the center of mass position variation coefficient c and the foot contact force $f_i$, which is obtained actually by transforming a relationship between the center of mass position and the foot contact force.

As an example, in practical applications, since the other variables in formula (10) are calculable, the center of mass position variation coefficient c is in a linear relationship with the foot contact force $f_i$.

6: a selected candidate foothold is introduced into the fifth relational expression. The selected candidate foothold refers to a foothold determined for the foot from multiple candidate footholds, also regarded as a target foothold.

There is usually more than one candidate foothold for a foot that the legged robot 110 needs to stand on, namely $r_i \in \{r_{ij} | j=1,2,3 \ldots N_i\}$ mentioned above, where $r_{ij}$ represents a position of a candidate foothold of an $i^{th}$ foot, and $N_i$ represents the number of candidate footholds of the $i^{th}$ foot.

As an example, only a value field of a foot contact force $f_i$ corresponding to the selected candidate foothold is not zero. Therefore, a binary variable $\beta ij \in \{0,1\}$ may be introduced, where j=1, 2, 3 ... $N_i$ represents a specific candidate foothold that is selected as the target foothold, namely:

$$r_1 = \sum_{j=1}^{N_i} \beta_{ij} r_{ij} \quad (11)$$

where $$\sum_{j=1}^{N_i} \beta_{ij} = 1 \quad (12)$$

Formula (12) represents that only one of $N_i$ binary variables is 1, and the others are 0. It indicates that only one candidate foothold may be selected as a target foothold. Therefore, the selected candidate foothold may be introduced into the fifth relational expression to obtain a rewritten center of mass kinetic equation as follows:

$$\sum_{i=1}^{N_c} \sum_{j=1}^{N_i} G_{ij} f_{ij} \approx Hc - w \quad (13)$$

$f_{ij}$, H, and w may have different values at different instants, so that formula (13) may further be represented as the following variation relationship:

$$\sum_{i=1}^{N_c} \sum_{j=1}^{N_i} G_{ij} f_{ijk} = H_k c - w_k \quad (14)$$

where k represents a $k^{th}$ instant, and $f_{ijk}$ represents a foot contact force at the $k^{th}$ instant when a $j^{th}$ candidate foothold is selected for the $i^{th}$ foot. $H_k$ represents H corresponding to the $k^{th}$ instant, and a specific representation of H may refer to the above. $w_k$ represents w corresponding to the $K^{th}$ instant, and a specific representation of w may refer to the above contents.

The above is the exemplary description of the creation process of the variation relationship. In practice, the center of mass motion trajectory of the legged robot 110 may be described by use of other kinetic equations, and the other kinetic equations are further transformed to obtain the variation relationship.

Second, the constraint set is obtained.

The constraint set includes one or more constraints, each of which is used for restricting a value of at least one of the center of mass position and the target foothold. Each constraint may be in an inequality form. The constraint set at least includes a spatial foothold constraint for restricting all footholds corresponding to the center of mass position of the legged robot 110 to be reachable for feet of the legged robot. The control device 120 may obtain the constraint set from a network resource or another device, or create the constraint set by itself. The following in an example of the creation of each constraint by the control device 120.

(1) The spatial foothold constraint is obtained.

1: a workspace corresponding to a foot of the legged robot 110 is approximated to a convex polyhedron, a representation of a linear inequality of each surface of the convex polyhedron is obtained, and a linear inequality representation of the convex polyhedron is obtained by combining the linear inequality of each surface. The linear inequality representation of the convex polyhedron is a sixth relational expression, specifically represented as follows:

$$S_i^T x_i \leq d_i \quad (15)$$

where $S_i = [s_{i1} \; s_{i2} \ldots s_{il}] \in R^{3\times 1}$, $d_i = [d_{i1} \; d_{i2} \ldots d_{il}] \mathring{A} R^1$, $x_i$ represents a foothold of the legged robot 110 under this coordinate system, $d_{i1}$ represents a distance between a surface of the convex polyhedron and the origin, $s_{i1}$ represents a unit normal vector corresponding to the surface of the convex polyhedron, 1 represents the number of surfaces corresponding to the convex polyhedron, c represents the center of mass position variation coefficient, and $\beta_{ij}$ represents the target foothold. The convex polyhedron is determined according to a bending range of a joint of a foot that the legged robot 110 stands on, and a length of the joint.

Specifically, the control device 120 discretely determines a position reachable for a foot of the legged robot 110 relative to a joint according to a bending range of the joint and a length of the joint. The joint is a joint of the foot for standing, specifically a joint directly connected with the foot, or another joint connected with the foot through the joint. The bending range of the joint refers to a range formed by a minimum angle and maximum angle of bending of the joint. For example, the bending range of the joint is 0° to 120°. The bending range is usually known. The length of the joint is, for example, 1 meter.

Figure 3:
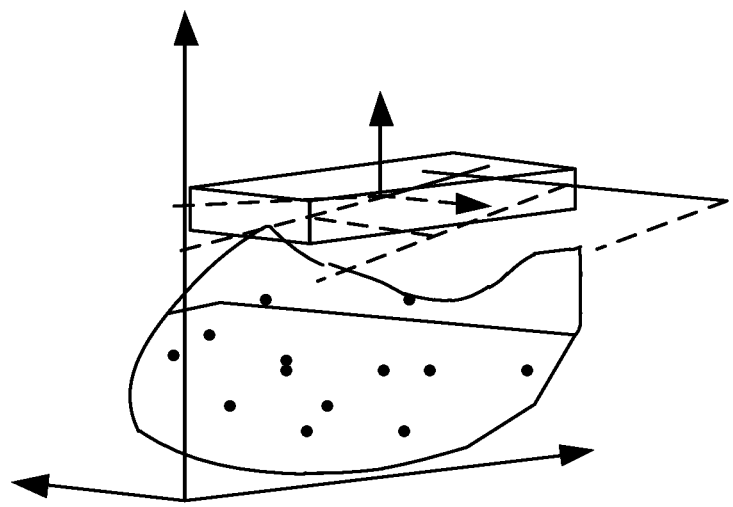
FIG. 3 is an example diagram of a workspace according to some embodiments.

After discretely determining multiple positions reachable for the foot of the legged robot 110 relative to the joint, the control device 120 fits the multiple positions, so as to obtain a workspace of the legged robot 110. The workspace corresponding to the foot of the legged robot 110 is usually a non-convex region, but may be approximated to a convex polyhedron by fitting. The convex polyhedron is specifically a convex polyhedron 310 shown in FIG. 3. Each of multiple points shown in FIG. 3 represents a position reachable for the foot relative to the joint.

After forming the convex polyhedron by approximation, the control device 120 may obtain a linear inequality representation of each surface of the convex polyhedron. The linear inequality representation of each surface is specifically represented as $s_{i1}^T x_i \le d_{i1}$. The control device 120 combines the inequality of each surface of the convex polyhedron, so as to obtain formula (15).

In an example embodiment, formula (15) may be implemented in a local fixed coordinate system of the joint. The local fixed coordinate system of the joint is a coordinate system established taking a part of the joint as a coordinate origin. That is, the coordinate origin of the local fixed coordinate system of the joint may be different from that of the world coordinate system. The joint may be any joint correlated with the foot for standing.

Figure 4:
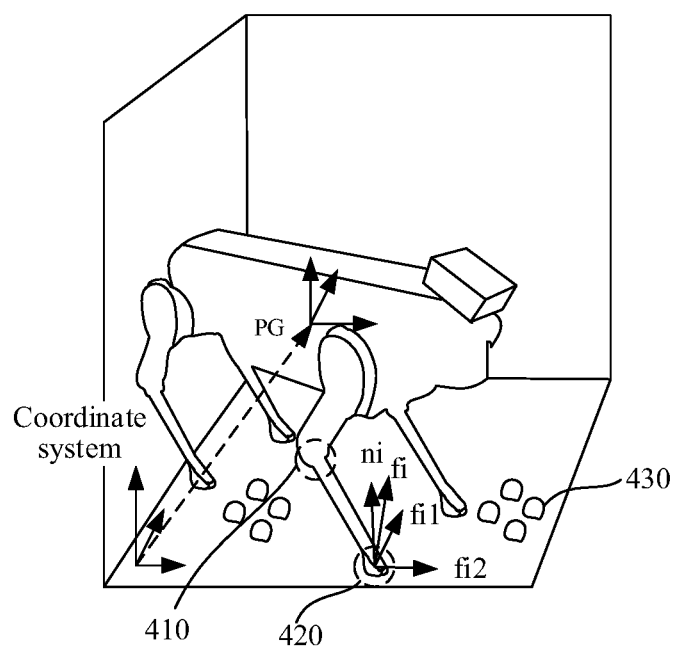
FIG. 4 is an example structural diagram of a legged robot according to some embodiments.

FIG. 4 is a schematic structural diagram of a legged robot 110. The legged robot 110 includes multiple joints 410 and four feet 420. Each foot 420 is provided with multiple joints. A coordinate system shown in FIG. 4 is a local fixed coordinate system of a joint.

Further, under the local fixed coordinate system, each variable may be decomposed into multiple variables according to the local fixed coordinate system of the joint.

For example, in FIG. 4, the foot contact force $f_i$ may be decomposed into $n_i$, $f_{i1}$, and $f_{i2}$, and the center of mass position $p_G$ may also be decomposed along the local fixed coordinate system.

As described above, the control device 120 has determined in advance candidate footholds 430 corresponding to the foot needed by standing. The control device 120 may determine, according to formula (15), whether a certain candidate foothold 430 that is selected is within the convex polyhedron corresponding to the foot. For example, whether the foothold of the $i^{th}$ foot of the legged robot 110 is within the convex polyhedron after the time interval t may be determined.

2: the foothold position $r_i$ is transformed into a representation of the local fixed coordinate system to obtain a seventh relational expression.

Formula (15) is a representation result under the local fixed coordinate system, so it is necessary to transform the position $r_i$ of the foot for standing under the world coordinate system (or referred to as a global coordinate system) into a representation result $x_i$ under the local fixed coordinate system. A specific transformation process is represented as:

$$x_i = R_{i1}^T (R_0^T (r_i - p_G) - p_{i1}) \quad (16)$$

where $R_0 \in R^{3 \times 3}$ is a rotation matrix, representing a body pose of the legged robot 110 at a current instant, $p_{i1} \in R^3$ represents a position of the joint of the $i^{th}$ foot of the legged robot 110 in a body coordinate system relative to the center of mass of the legged robot 110, $R_{i1} \in R^3$ represents a body pose of the joint in the local fixed coordinate system relative to the body coordinate system, and $p_{i1}$ and $R_{i1}$ are both constants.

When a body pose of the legged robot 110 changes slightly, $R_0$ may be a constant, or may be determined by the control device 120 according to the body pose of the legged robot 110 at the current instant.

3: the center of mass position in the seventh relational expression is represented as a time independent nth-order polynomial, and is typed into the sixth relational expression to obtain an eighth relational expression.

The control device 120 combines formulas (4), (8), (16), and (15) to obtain the eighth relational expression:

$$A_i c + B_i r_i \le b_i \quad (17)$$

where $$A_i = -S_i^T R_{i1}^T R_0^T T$$

$$B_i = S_i^T R_{i1}^T R_0^T$$

$$b_i = d_i + S_i^T R_{i1}^T p_{i1} + S_i^T R_{i1}^T R_0^T p^{init}$$

4: the selected foothold and time are introduced into the eighth relational expression to obtain the spatial foothold constraint.

The selected candidate foothold is introduced into the eighth relational expression to obtain a ninth relational expression specifically by combining formula (11) and formula (17), represented as:

$$A_i c + \sum_{j=1}^{N_i} \beta_{ij} B_i r_{ij} \le b_i \quad (18)$$

Some corresponding quantities in the spatial foothold constraint have different values at different instants, so time may be introduced into the ninth relational expression to obtain the spatial foothold constraint as follows:

$$A_{ik} c + \sum_{j=1}^{N_i} \beta_{ij} B_{ik} r_{ij} \le b_{ik} \quad (19)$$

where $A_{ik}$, $B_{ik}$, and $b_{ik}$ represent $A_i$, $B_i$, and $b_i$ corresponding to the $k^{th}$ instant respectively.

In an example embodiment, besides the spatial foothold constraint, the constraint set may include one or two of a frictional force constraint for restricting a frictional force between the foot in contact with the contact surface and the contact surface, and a contact force constraint for restricting a component of the foot contact force in a normal direction to be less than or equal to a contact force upper limit, the frictional force between the foot for standing and the contact surface being determined according to the foot contact force and a friction coefficient.

Since the legged robot 110 has different foot contact forces at respective instants, frictional forces between the foot and the contact surface are also different at respective instants. Therefore, the frictional force constraint actually restricts a frictional force between the foot in contact with the contact surface and the contact surface at each instant, and the contact force constraint restricts a component of the foot contact force in the normal direction at each instant.

The following is an example of how the control device 120 creates the frictional force constraint and the contact force constraint.

(2) The frictional force constraint is obtained.

1: a frictional force constraint representation corresponding to each contact force is determined to obtain a tenth relational expression.

Each foot contact force $f_i (i=1, 2 \ldots N_c)$ is subjected to a frictional force constraint, which may be specifically approximated to the following tenth relational expression:

$$N_i^T f_i \leq 0 \quad (20)$$

where $N_i = -[\mu_i n_i - o_i \ \mu_i n_i + o_i \ \mu_i n_i - t_i \ \mu_i n_i + t_i] \in R^{3 \times 4}$, $n_i$ represents a normal vector of the foothold of the $i^{th}$ foot, $o_i$ represents a vector of the foothold of the $i^{th}$ foot in a tangential direction, $t_i$ represents a vector of the foothold of the $i^{th}$ foot in another tangential direction, and $\mu_i$ represents a friction coefficient between the foot and the contact surface.

In case of different materials of the contact surface in contact with the foot, the friction coefficient may correspondingly have different values. At the same instant, if different feet are in contact with different contact surfaces, friction coefficients between different feet and the contact surfaces may also be different.

2: time and the foot for standing are introduced into the tenth relational expression to obtain the frictional force constraint.

Specifically, a normal vector at a position $r_{ij}$ corresponding to the foot is $n_{ij}$, the foot contact force is $f_{ij}$, and an eleventh relational expression is obtained:

$$N_{ij}^T f_{ij} \leq 0 \quad (21)$$

where, $N_{ij}$ represents a corresponding value of $N_i$ when the $j^{th}$ candidate foothold is selected for the $i^{th}$ foot.

Foot contact forces at different instants are different, so instant may be introduced into formula (17) to obtain the frictional force constraint:

$$N_{ij}^T f_{ijk} \leq 0 \quad (22)$$

where, $f_{ijk}$ represents a foot contact force at the $k^{th}$ instant when the $j^{th}$ candidate foothold is selected for the $i^{th}$ foot.

(3) The contact force constraint is obtained.

During the motion of the legged robot 110, an excessively strong foot contact force between the foot and the contact surface is likely to damage a component of the legged robot 110. Therefore, the contact force constraint may be set to restrict the foot contact force between the legged robot 110 and the contact surface to avoid an excessively strong acting force between the legged robot 110 and the contact surface during each motion. The following is an example of how the control device 120 creates the contact force constraint.

1: a component of the foot contact force in a normal direction is set to be less than or equal to a contact force upper limit, to obtain a twelfth relational expression:

$$n_i^T f_i \leq f_i^u \quad (23)$$

where, $f_i^u$ represents the contact force upper limit whose value is set according to an actual situation, for example, set with reference to a gravity of the legged robot.

2: time and the foot for standing are introduced into the twelfth relational expression to obtain a third constraint.

There is a foot contact force between a foot for standing each time and the contact surface, so formula (23) may be rewritten as:

$$n_{ij}^T f_{ij} \leq f_i^u \beta_{ij} \quad (24)$$

Foot contact forces at respective instants are different, so time is introduced into formula (19), specifically represented as:

$$n_{ij}^T f_{ijk} \leq f_i^u \beta_{ij} \quad (25)$$

where $n_{ij}^T$ represents a corresponding value of $n_i^T$ when the $j^{th}$ candidate foothold is selected for the $i^{th}$ foot, and $f_{ijk}$ represents the foot contact force at the $k^{th}$ instant when the $j^{th}$ candidate foothold is selected for the $i^{th}$ foot.

Since there are few relational expressions corresponding to the variation relationship and the constraint set and many unknown quantities to be solved, there may be more than one center of mass position variation coefficient and foothold that satisfy the variation relationship and the constraint set. Therefore, when the center of mass position variation coefficient and the target foothold are determined, the target center of mass position variation coefficient and the target foothold may be determined randomly from values that satisfy the variation relationship and the constraint set. Alternatively, in order to obtain a better center of mass position variation coefficient and foothold, in some embodiments, a target function may further be introduced, such that a best center of mass position variation coefficient and foothold are screened by use of the target function, the best center of mass position variation coefficient is further determined as the target center of mass position variation coefficient, and the best foothold is determined as the target foothold.

Since solving the quadratic programming problem may obtain a corresponding solution, in some embodiments, the determination of the target center of mass position variation coefficient and the target foothold may be transformed into a quadratic programming problem. Therefore, the target function in some embodiments at least includes a quadratic term of one or more variables. The one or more variables may be any relevant variables of candidate results that satisfy the variation relationship and the constraint set. The quadratic term may be constructed according to a square of the variable.

In an embodiment, the target function includes at least one of the A1 to A5:

A1: a quadratic term relevant to a foot contact force variation in the motion path;

A2: a quadratic term of a center of mass position variation in the motion path;

A3: a quadratic term of a difference between an ending center of mass position corresponding to the spatial path ending point in the center of mass state data and a center of mass position corresponding to the spatial path ending point in the candidate result;

A4: a quadratic term of a difference between an ending center of mass velocity at the spatial path ending point in the center of mass state data and a center of mass velocity at the spatial path ending point in the candidate result; and A5: a quadratic term of a difference between an ending center of mass acceleration at the spatial path ending point in the center of mass state data and a center of mass acceleration at the spatial path ending point in the candidate result.

Functions of each quadratic term will now be analyzed.

Function of A1: the foot contact force variation may be used for optimizing the distribution of the acting force between the foot and the contact surface such that the acting force between the foot and the contact surface during walking of the legged robot 110 is distributed more uniformly.

Function of A2: the center of mass position variation reflects a length of the center of mass motion trajectory, and helps reduce the oscillation amplitude of the center of mass motion trajectory.

Function of A3 to A5: they help reduce an error between a calculation result and an actual result.

Combining A1 to A5, an expression of the target function is as follows:

$$J_{grf}+J_{len}+J_{tgt} \tag{26}$$

where $J_{grf}$ represents a weighted sum of squares of all foot contact forces in the motion path, $J_{len}$ represents a weighted sum of squares of differences between center of mass position variations between every two adjacent instants, and $J_{tgt}$ represents a weighted sum of squares of a difference between an ending center of mass position corresponding to the spatial path ending point in the center of mass state data and a center of mass position corresponding to the spatial path ending point in the candidate result, a difference between the center of mass velocity corresponding to an ending position in the candidate result and a center of mass velocity corresponding to state data of the ending position, and a difference between a center of mass acceleration corresponding to the ending position in the candidate result and a center of mass acceleration corresponding to the state data of the ending position.

Figure 5:
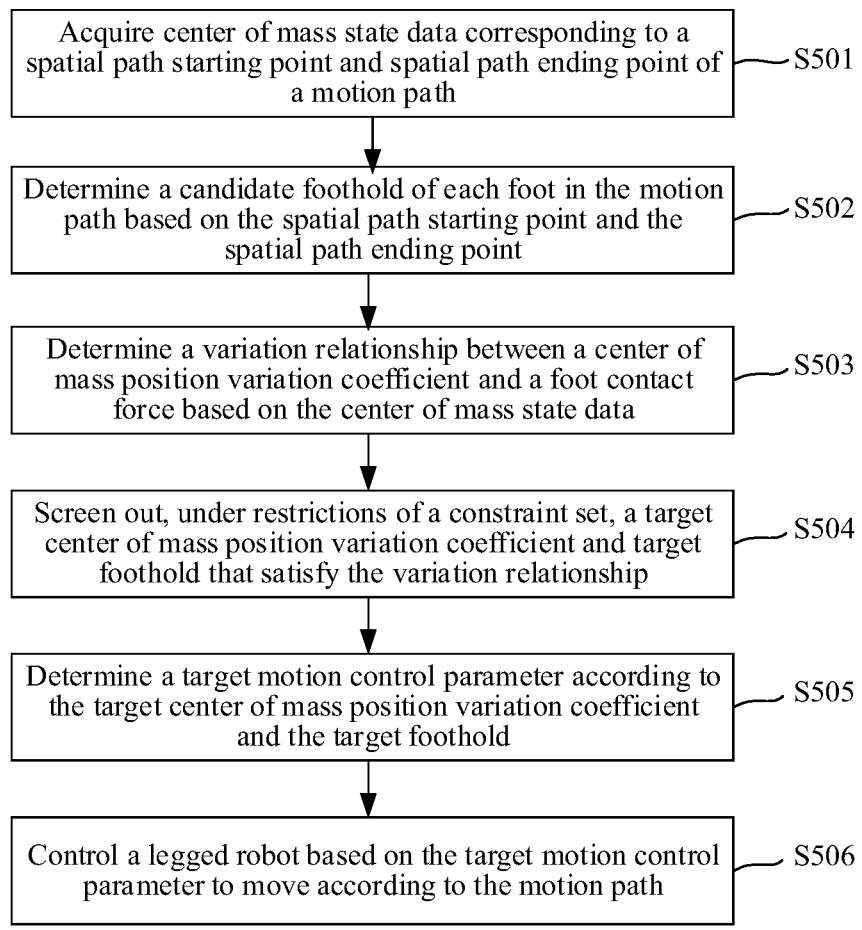
FIG. 5 is a flowchart of a legged robot motion control method according to some embodiments.

After the introduction about the construction of the variation relationship, the constraint set, and the target function, the following describes how to determine the center of mass position and the target foothold by use of the constructed variation relationship and constraint set in the embodiments in combination with a process of the legged robot motion control method shown in FIG. 5. The method shown in FIG. 5 may be performed by a legged robot motion control device shown in FIG. 9, the method including the following operations:

S501: Acquire center of mass state data corresponding to a spatial path starting point and spatial path ending point of a motion path.

When the legged robot 110 moves, the control device 120 controls the legged robot 110 to bring its foot up and down to further implement the movement of the legged robot 110, such that the legged robot 110 may complete the motion along the whole motion path from the spatial path starting point to the spatial path ending point. The spatial path starting point is a current position of the legged robot 110. The spatial path ending point is a position to be reached by the legged robot 110. The spatial path ending point may be preset, or determined by the control device 120 according to a task to be executed by the legged robot 110.

The meaning and acquisition manner of the center of mass state data is described above, and will not be elaborated herein again. The center of mass state data may include a center of mass position. Alternatively, the control device 120 may obtain, according to one of a center of mass position, a center of mass velocity, or a center of mass acceleration, the other two values. The center of mass position, the center of mass velocity, or the center of mass acceleration may be represented by a coordinate in a coordinate system, or by a vector, etc.

In an embodiment, the motion path, the spatial path starting point, and the spatial path ending point are correlated with a selected sampling period of the legged robot 110, and may be set flexibly as actually needed.

For example, the control device 120 may determine a position of the legged robot 110 corresponding to a current instant as the spatial path starting point, the control device 120 may determine a position corresponding to a $3^{rd}$ second as the spatial path ending point, and in a next sampling period, the $3^{rd}$ second may be selected as a spatial path starting point for motion of the legged robot 110.

S502: Determine a candidate foothold of each foot in the motion path based on the spatial path starting point and the spatial path ending point.

The legged robot 110 may stand on one or more feet when moving from the spatial path starting point to the spatial path ending point. It may stand on each foot once or for many times, which is specifically correlated with the set spatial path starting point and spatial path ending point. The control device 120 may determine in advance multiple candidate footholds for a foot needed by standing each time. The candidate foothold is a possible foothold of the legged robot 110 in the motion path. The foothold may be represented by a coordinate in a world coordinate system, or by a vector, etc.

In a specific implementation, the control device 120 may collect an environmental image of the legged robot 110 through the visual sensing unit 210, and construct a transformation relationship between each pixel in the environmental image and the world coordinate system. The control device 120 determines a possible candidate foothold in a moving direction from the spatial path starting point to the spatial path ending point based on the environmental image and the transformation relationship.

The control device 120 may specifically recognize an obstacle from the spatial path starting point to the spatial path ending point according to the environmental image, determine a non-obstacle position in the moving direction from the spatial path starting point to the spatial path ending point according to the transformation relationship, and determine the determined position as a candidate foothold.

Alternatively, the control device 120 collects a three-dimensional point cloud image of an environment through the visual sensing unit 210, and determine a candidate foothold from the three-dimensional point cloud image according to the three-dimensional point cloud image of the environment. Specifically, a non-obstacle position may be determined from the three-dimensional point cloud image as the candidate foothold. When the visual sensing unit 210 is an RGBD camera, the three-dimensional point cloud image may be collected, or the three-dimensional point cloud image may be obtained by, for example, collecting multiple environmental images of a current environment of the legged robot 120 and performing three-dimensional reconstruction on the multiple environmental images.

Alternatively, the control device 120 may randomly select multiple positions in the moving direction from the spatial path starting point to the spatial path ending point as candidate footholds.

The legged robot 110 may stand more than once in the motion path, so the control device 110 may determine all possible candidate footholds in the motion path, all of the possible candidate footholds being candidate footholds for standing each time. Alternatively, when the candidate footholds are determined, large regions where the legged robot 110 probably stands may be determined according to a motion velocity of the legged robot 110, and the candidate footholds are sequentially screened out from the large regions for standing each time according to any above-mentioned manner.

For example, referring back to FIG. 4, a current position of the legged robot 110 is shown in FIG. 4, and the control device 120 determines that candidate footholds 430 of feet include multiple circles on the ground shown in FIG. 4.

S503: Determine a variation relationship between a center of mass position variation coefficient and a foot contact force based on the center of mass state data.

The variation relationship is, for example, formula (14) described above. The meaning of the variation relationship is described above, and will not be elaborated herein again.

In order to implement motion control of the legged robot 110, it is theoretically necessary to obtain a center of mass position of the legged robot 110 at any instant from the spatial path starting point to the spatial path ending point. However, this may result in a relatively large amount of calculation. Therefore, in some embodiments, the control device 120 may obtain a center of mass position at each of multiple instants in the motion path, and further determine a center of mass motion trajectory based on the center of mass positions at the multiple instants.

Referring to the variation relationship shown in formula (14), besides a center of mass position variation coefficient and a foot contact force, the variation relationship also includes $H_k$, $w_k$, and other parameters. Therefore, values of these parameters may be determined according to known quantities such as the center of mass state data to further obtain a variation relationship only including the two unknown quantities of the center of mass position variation coefficient and the foot contact force.

The following is an example of how the control device 120 obtains the variation relationship.

S1.1: Obtain a movement duration.

The control device 120 may obtain, according to a length of the motion path and a motion velocity of the legged robot 110, a movement duration needed by the legged robot to complete the motion path. Alternatively, the control device 120 is directly pre-configured with a movement duration needed by the legged robot 110 to complete the motion path.

After obtaining the movement duration, the control device 120 may obtain multiple sampling instants by random sampling from the movement duration as it is relatively simple to obtain the sampling instants by random sampling.

Alternatively, the control device 120 obtains multiple sampling instants by sampling from a duration of each motion phase according to a step sequence of the legged robot 110. Each motion phase has corresponding sampling instants, so it may be ensured that there are corresponding sampling instants in each motion phase, which is conducive to improving the accuracy of the center of mass motion trajectory determined later.

In some embodiments, time intervals between every two adjacent sampling instants may be the same or different. Different refers to that the time intervals between every two adjacent sampling instants are not completely the same, or there is a different time interval between two adjacent sampling instants.

In some embodiments, if there are more sampling instants, the sampling instants are distributed more reasonably, and the determined center of mass motion trajectory is more accurate. However, if there are more sampling instants, more relational expressions may be subsequently constructed to determine a center of mass position variation coefficient and a target foothold, and more time may be needed to determine the center of mass position variation coefficient and the target foothold. Therefore, it is quite important to plan the number of sampling instants reasonably. In some embodiments, the sampling instants at least include a starting instant and ending instant of each motion phase, as well as at least one intermediate instant in each motion phase. The intermediate instant is any instant between the starting instant and ending instant of the motion phase.

For example, a quadrupedal walking gait of the legged robot 110 is set as a sampling period, and the control device 120 sequentially divides a motion process of the legged robot 110 in the sampling period into eight motion phases, specifically: four-foot supported center of mass movement (referred to as 4S for short), stepping with the hind-right foot (referred to as HR for short), stepping with the front-right foot (referred to as FR for short), four-leg supported center of mass movement (referred to as 4S for short), four-foot supported center of mass movement (referred to as 4S for short), stepping with the hind-left foot (referred to as HL for short), stepping with the front-left foot (referred to as FL for short), and four-foot supported center of mass movement (referred to as 4S for short).

Figure 6:
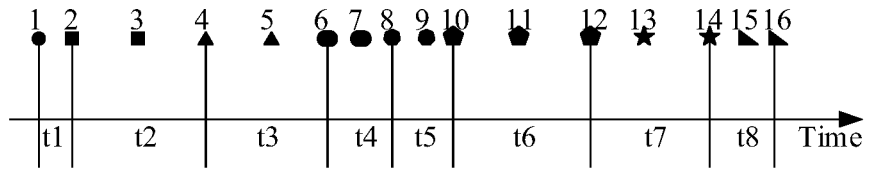
FIG. 6 is a schematic distribution diagram of sampling instants according to some embodiments.

FIG. 6 is a schematic distribution diagram of sampling instants according to some embodiments. FIG. 6 shows durations of the eight motion phases, t1, t2, t3, t4, t5, t6, t7, and t8, respectively. For ease of description, the eight phases are referred to as a first motion phase, a second motion phase, and so on respectively. The control device 120 obtains multiple sampling instants by sampling from each motion phase, i.e., sampling instants 1 and 2 in the first motion phase, sampling instants 2, 3, and 4 in the second motion phase, sampling instants 4, 5, and 6 in the third motion phase, sampling instants 6, 7, and 8 in the fourth motion phase, and so on in FIG. 6. In FIG. 6, sampling instants represented by the same shape represent that the sampling instants belong to the same motion phase, and sampling instants represented by different shapes represent that the two sampling instants belong to two different motion phases.

Since motion phases in a sampling period are continuous, an ending instant of a certain motion phase may be regarded as a sampling instant of this motion phase, or a sampling instant of the next motion phase. For example, the sampling instant 6 in FIG. 6 may be regarded as a sampling instant of the third motion phase and the fourth motion phase.

S1.2: Determine multiple sampling instants from the movement duration, and determine a time interval between each sampling instant and an instant corresponding to the spatial path starting point.

The control device 120 has known a starting instant corresponding to the spatial path starting point and each sampling instant, and thus may determine a time interval between each sampling instant and the starting instant. Multiple time intervals may be obtained corresponding to the multiple sampling instants.

S1.3: Obtain, for each sampling instant, a variation relationship between the center of mass position variation coefficient and a foot contact force at each sampling instant according to the time interval corresponding to each sampling instant, the starting center of mass position, and a relational expression between a center of mass position and foot contact force at each sampling instant.

The relational expression between the center of mass position and foot contact force at each sampling instant is a pre-existing relational expression. The relational expression is specifically formula (3) described above.

The control device 120 may determine values of $H_k$ and $w_k$ in formula (14) according to the time interval corresponding to each sampling instant and the starting center of mass position, so as to obtain a variation relationship between the two unknown quantities of the center of mass position variation coefficient and a foot contact force at each sampling instant.

As described above, $H = H_0[T^T \ \dot{T}^T]^T$, and $$H_0 = m \begin{bmatrix} 0_{3 \times 3} & I_{3 \times 3} \\ \hat{g} & \overline{p^{\text{init}}} \end{bmatrix}.$$

The time interval corresponding to each sampling instant may be typed into the two formulas to calculate a value of $H_k$ corresponding to each instant.

$w_k$ may be a fixed value. Alternatively, the gravity of the legged robot 110, the starting center of mass position, and a value of a center of mass angular momentum L at a $k^{th}$ instant are typed into formula $$w = \begin{bmatrix} mg \\ m\overline{p^{\text{init}}}g - \dot{L} \end{bmatrix}$$

to obtain a value of $w_k$ at the $k^{th}$ instant. A value of $w_k$ corresponding to each sampling instant is calculated in this manner. The center of mass angular momentum may be calculated based on a body pose at each sampling instant. The $k^{th}$ instant is a selected sampling instant, so the $k^{th}$ moment may also be referred to as a $k^{th}$ sampling instant.

Further, the control device 120 obtains the step sequence of the legged robot 110, and thus may obtain a foot needed by standing in each motion phase and corresponding values of $N_i$ and $N_c$ corresponding to each sampling instant in formula (14). In addition, after determining the step sequence, the control device 120 may correspondingly obtain, if a foot needed by standing each time is determined, a position $r_{ij}$ of an $i^{th}$ contact point of the legged robot 110 in contact with a contact surface at each sampling instant under the world coordinate system, or at least represent $r_{ij}$ according to a selected candidate foothold.

The following describes an analysis of the values of variables involved in each motion phase shown in FIG. 6.

(1) In the first 4S phase, contact positions of four feet of the legged robot 110 and the contact surface have been determined, so it may be determined that a value of $N_i$ is 1, the number of footholds $N_c$ is 4, and a value of $r_{ij}$ is also known.

(2) When the legged robot 110 is at a sampling point in the HR phase, the hind-right foot is in the air and yet not in contact with the ground, so corresponding $N_i$ is 0. That is, it is unnecessary to take any constraint on the hind-right foot into consideration. The values of the number of footholds $N_c$ and $r_{ij}$ are the same as those in (1).

(3) When the legged robot 110 is at a certain instant in the next FR phase and each subsequent phase, the hind-right foot has contacted with the ground, whose position determines the selection of the foothold, so $N_i$ corresponding to the hind-right foot is not set to 1, and $r_{ij}$ is a candidate foothold position of the hind-right foot. The front-right foot is brought up and yet not in contact with the ground, so corresponding $N_i$ is set to 0, and so on.

After the values of $w_k$, $H_k$, $N_i$, and $N_c$ corresponding to each sampling instant are determined, the obtained values corresponding to each sampling instant are typed into formula (14) to obtain the variation relationship between the center of mass position variation coefficient and the foot contact force corresponding to each sampling instant. If there are multiple sampling instants, each sampling instant corresponds to a variation relationship.

S504: Screen out, under restrictions of a constraint set, a target center of mass position variation coefficient and target foothold that satisfy the variation relationship.

The constraint set includes a spatial foothold constraint. The meaning and specific expression of the spatial foothold constraint may refer to the above contents, and will not be elaborated herein. The spatial foothold constraint may specifically refer to formula (19).

Since it is not possible to obtain a unique solution according to the variation relationship corresponding to each sampling instant and the constraint set, the control device 120 may determine multiple sets of candidate results that satisfy the variation relationship corresponding to each sampling instant and the constraint set. Each set of candidate result includes a center of mass position variation coefficient and a target foothold corresponding to each of the multiple sampling instants. The candidate result may further include a contact force $f_{ijk}$ corresponding to each sampling instant. The control device 120 may determine the center of mass position variation coefficient in any one of the multiple sets of candidate results as a target center of mass position variation coefficient, and determine the foothold in the candidate result as a target foothold.

Alternatively, the control device 120 may determine a target center of mass position variation coefficient and a target foothold from the multiple sets of candidate results according to a target function. The following is an example process of determining the candidate results by the control device 120.

Operation 1: Obtain, for each sampling instant, a target constraint relationship between the center of mass position variation coefficient and a foothold at each sampling instant according to a foot in contact with a contact surface at each sampling instant, a body pose of the legged robot at each sampling instant, and the spatial foothold constraint.

An expression of the spatial foothold constraint may refer to formula (19) described above. Besides the center of mass position variation coefficient c and the selected candidate foothold $\beta_{ij}$, formula (19) also includes some variables to be determined by the control device 120, specifically including $A_{ik}$, $B_{ik}$, $B_{ik}$, and $b_{ik}$ in formula (19). The follow is an example of how the control device 120 determines these variables.

When a body pose of the legged robot 110 changes slightly, the control device 120 may determine the values of the variables $A_{ik}$, $N_i$, $B_{ik}$, and $b_{ik}$ in the spatial foothold constraint according to the number of feet in contact with the contact surface at each sampling instant, rotation ranges of joints corresponding to the feet of the legged robot 110, and lengths of the joints, to further obtain a target constraint relationship between a foothold at each sampling instant and the center of mass position variation coefficient c.

Alternatively, when the change of a body pose of the legged robot 110 is too great to ignore, the control device 120 may determine the values of the variables $A_{ik}$, $N_i$, $B_{ik}$, and $b_{ik}$ according to the number of feet in contact with the contact surface at each sampling instant, the body pose of the legged robot 110, rotation ranges of joints corresponding to the feet of the legged robot 110, and lengths of the joints, to further obtain a target constraint relationship between a target foothold at each sampling instant and a polynomial coefficient.

In some embodiments, the rotation range of the joint corresponding to the foot of the legged robot 110 and the length of the joint may be obtained by the control device 120 by using a default joint length and joint bending range, or are a joint length and joint bending range of the legged robot 110 obtained in advance by the control device 120. Rotation angles of joints corresponding to any two feet of the legged robot 110 and lengths of the joints may be the same or different.

In some embodiments, the constraint set also includes a frictional force constraint. The meaning of the frictional force constraint is described above and will not be elaborated again. In such case, the control device 120 may obtain a constraint relationship between a foothold and foot contact force corresponding to each sampling instant according to the sampling instant and the frictional force constraint.

In an embodiment, the constraint set also includes a contact force constraint, whose meaning may refer to the above contents and will not be elaborated. In such case, the control device 120 may obtain a constraint relationship between a foothold and foot contact force corresponding to each sampling instant according to a value of a contact force upper limit, the sampling instant, and the contact force constraint.

For example, referring back to the example shown in FIG. 6, (1) for a sampling point in the first 4S phase, initial contact positions of the four feet and the ground have been determined, so $N_i$ is valued to 1, $\beta_{ij}$ is valued to 1, and $r_{ij}$ is an initial position of the foot.

(2) When the legged robot is at a sampling point in the HR phase, the hind-right foot is in the air and yet not in contact with the ground, so corresponding $N_i$ is 1. That is, it is unnecessary to take any constraint on the hind-right foot into consideration and the others remain the same.

(3) When the robot is at a certain instant in the next FR phase and each subsequent phase, the hind-right foot has contacted with the ground, whose position determines the selection of the foothold, so $N_i$ corresponding to the hind-right foot is not valued to 1, corresponding $\beta_{ij}$ is set as a binary variable, and $r_{ij}$ is a candidate foothold position of the hind-right foot. The front-right foot is brought up and yet not in contact with the ground, so corresponding $N_i$ is valued to 0, and so on.

Operation 2: Obtain multiple sets of candidate results by combining the variation relationship corresponding to each sampling instant and the target constraint relationship corresponding to each sampling instant.

The control device 120 may determine, according to the variation relationships corresponding to the sampling instants and the target constraint relationship corresponding to each sampling instant, each set of candidate result satisfying these relationships. The meaning of the candidate result is described above, and will not be elaborated herein again.

In an embodiment, if the constraint set also includes the frictional force constraint and/or the contact force constraint, the determined each set of candidate result also needs to satisfy these constraints.

For example, the candidate result specifically needs to satisfy the following relational expression:

$$\begin{cases} \sum_{i=1}^{N_c}\sum_{j=1}^{N_i} G_{ij}f_{ijk} = H_k c - w_k \\ A_{ik}c + \sum_{j=1}^{N_i} \beta_{ij}B_{ik}r_{ij} \le b_{ik} \\ n_{ij}^T f_{ijk} \le f_i^u \beta_{ij} \\ N_{ij}^T f_{ijk} \le 0 \\ \beta_{ij} \in \{0,1\}, \sum_{j=1}^{N_i} \beta_{ij} = 1 \\ i = 1,2,\ldots N_c \\ j = 1,2,\ldots N_i \\ k = 1,2,\ldots K \\ T(0)c = 0, \dot{T}(0)c = v_0, \ddot{T}(0)c = a_0 \end{cases} \quad (27)$$

where k represents any sampling instant. The meanings of the other letters in the formula may refer to the above contents, and will not be elaborated herein. $v_0$ represents a center of mass velocity. $a_0$ represents a center of mass acceleration.

In an embodiment, the control device 120 may randomly determine a candidate result from the multiple sets of candidate results as a final target result.

Operation 3: Minimize a target function according to the multiple sets of candidate results to obtain a target result.

In some embodiments, the control device 120 combines a target function to obtain a final target result.

Specifically, after obtaining the candidate results, the control device 120 may determine a value of the target function corresponding to each set of candidate result, and determine the candidate result corresponding to the minimum value of the target function as the target result. A process of obtaining a value of the target function corresponding to a set of candidate result by the control device 120 will now be described taking the target function being formula (26) described above as an example.

(1) The control device 120 obtains a foot contact force corresponding to each sampling instant according to a center of mass position at each of multiple sampling instants in a set of candidate result, and determines a weighted sum of squares of the foot contact forces, so as to obtain a value of $J_{grf}$ in the target function shown as formula (26). Weights for the contact forces may be the same or different.

(2) The control device 120 determines a weighted sum of squares of differences between center of mass positions at every two adjacent sampling instants in the multiple sampling instants, so as to obtain a value of $J_{len}$ in the target function shown as formula (26). Weights for the center of mass positions may be the same or different.

(3) The control device 120 determines a weighted sum of squares of a difference between a center of mass position corresponding to the spatial path ending point in the candidate result and a center of mass position corresponding to the spatial path ending point in the center of mass state data, a difference between a center of mass velocity corresponding to the spatial path ending point in the candidate result and a center of mass velocity corresponding to the spatial path ending point in the center of mass state data, and a difference between a center of mass acceleration corresponding to the spatial path ending point in the candidate result and a center of mass acceleration corresponding to the spatial path ending point in the center of mass state data, so as to obtain a value of $J_{tgt}$ in the target function shown as formula (26).

After obtaining the values of $J_{grf}$, $J_{len}$, and $J_{tgt}$ in the target function shown as formula (26), the control device 120 determines a sum of the values of $J_{grf}$, $J_{len}$, and $J_{tgt}$, so as to determine a value of the target function corresponding to the candidate result.

S505: Determine a target motion control parameter according to the target center of mass position variation coefficient and the target foothold.

The control device 120 obtains the center of mass position variation coefficient after obtaining the target result. The control device 120 may obtain center of mass positions at multiple sampling instants according to the center of mass position variation coefficient and the corresponding time interval. Specific calculation formulas that are involved may refer to the above formula (4) and formula (8).

After obtaining the center of mass positions at the multiple sampling instants, the control device 120 may obtain the center of mass motion trajectory by fitting according to the center of mass positions at the multiple sampling instants, or perform interpolation on the center of mass positions at the multiple sampling instants to obtain the center of mass motion trajectory of the legged robot 110. There are many fitting manners, and no limits are made herein. After the center of mass motion trajectory is obtained, the center of mass position of the legged robot 110 at each instant is obtained.

Figure 7:
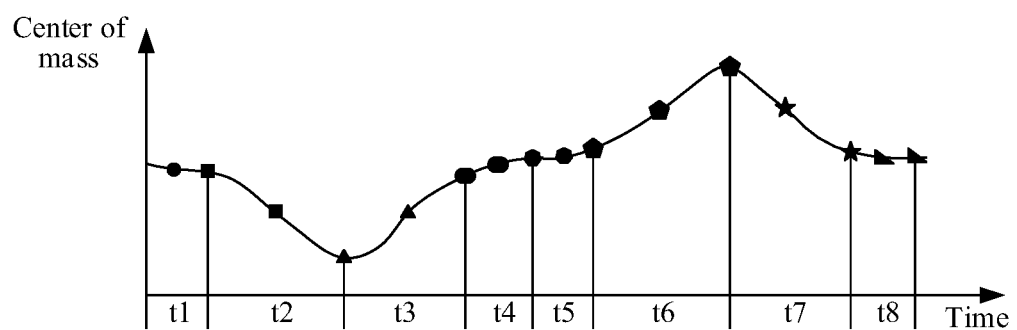
FIG. 7 is a schematic diagram of a center of mass motion trajectory according to some embodiments.

FIG. 7 shows the center of mass motion trajectory obtained by fitting according to the target result determined in FIG. 6. It can be seen from FIG. 7 that the center of mass position varies constantly in different motion phases.

Further, the control device 120 may calculate a whole-body motion trajectory of the legged robot by inverse dynamics according to the center of mass position and target foothold of the legged robot 110. The whole-body motion trajectory includes a joint angle of each joint of the legged robot 110 corresponding to each instant. The joint angle is used for representing an angle presented after rotation of the joint of the legged robot. Then, joint torques of multiple joints of the robot in the motion path are determined by inverse dynamics and optimization control. Both the joint torque and the joint angle may be regarded as target motion control parameters.

S506: Control a legged robot based on the target motion control parameter to move according to the motion path.

Specifically, the control device 120 may control each joint in each foot of the legged robot 110 to bring each foot of the legged robot 110 up or down, so as to drive the legged robot 110 to move along the motion path. The control device 120 specifically controls the joint torques of the multiple joints of the legged robot 110 such that at least one foot of the legged robot supports the legged robot to move, with an actual center of mass position of the legged robot kept at the determined center of mass position as much as possible.

In some embodiments, the spatial foothold constraint is introduced to determine the center of mass position and target foothold of the legged robot 110, so that the determined center of mass position satisfies the spatial foothold constraint. Therefore, the determined center of mass position conforms better to an actual motion process of the legged robot, the adaptability of the center of mass position is improved, and the joint torque determined based on the center of mass position and the target foothold are more reasonable.

Figure 8:
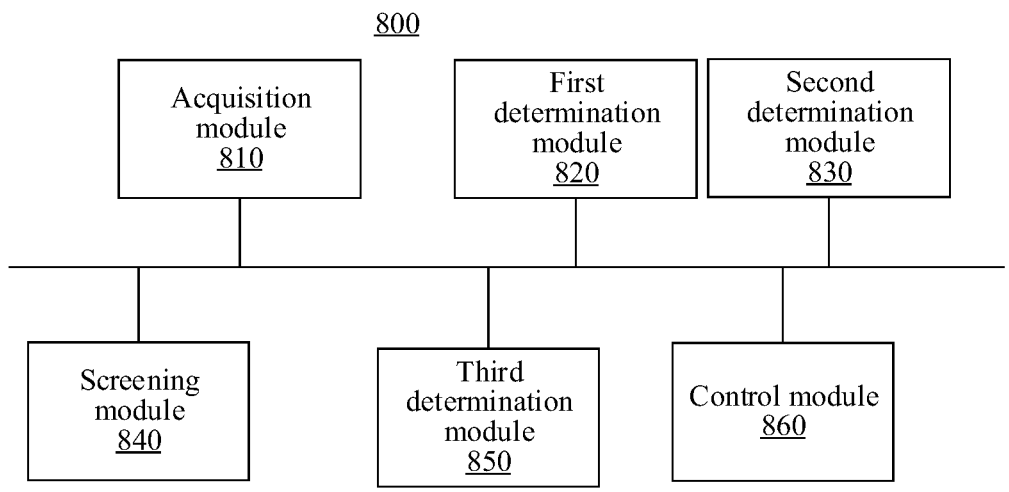
FIG. 8 is a schematic structural diagram of a legged robot motion control apparatus according to some embodiments.

Based on the same inventive concept, some embodiments provide a legged robot motion control apparatus, which is equivalently disposed in the terminal device 120 described above. FIG. 8 shows a schematic structural diagram of a legged robot motion control apparatus according to some embodiments, the legged robot motion control apparatus 800 includes:

an acquisition module 810, configured to acquire a center of mass state data corresponding to a spatial path starting point and spatial path ending point of a motion path;

a first determination module 820, configured to determine a candidate foothold of each foot in the motion path based on the spatial path starting point and the spatial path ending point;

a second determination module 830, configured to determine a variation relationship between a center of mass position variation coefficient and a foot contact force based on the center of mass state data;

a screening module 840, configured to screen out, under restrictions of a constraint set, a target center of mass position variation coefficient and target foothold that satisfy the variation relationship, the constraint set including a spatial foothold constraint;

a third determination module 850, configured to determine a target motion control parameter according to the target center of mass position variation coefficient and the target foothold; and a control module 860, configured to control a legged robot based on the target motion control parameter to move according to the motion path.

In some embodiments, the center of mass state data includes a starting center of mass position corresponding to the spatial path starting point. The second determination module 830 may be further configured to:

obtain a movement duration needed by the legged robot to complete the motion path;

determine multiple sampling instants from the movement duration, and determine a time interval between each sampling instant and an instant corresponding to the spatial path starting point; and obtain, for each sampling instant, a variation relationship between the center of mass position variation coefficient and a foot contact force at each sampling instant according to the time interval corresponding to each sampling instant, the starting center of mass position, and a relational expression between a center of mass position and foot contact force at each sampling instant.

In some embodiments, the second determination module 830 may be further configured to:

determine a center of mass angular momentum at each sampling instant according to a body pose at each sampling instant; and obtain the variation relationship between the center of mass position variation coefficient and the foot contact force at each sampling instant according to the center of mass angular momentum at each sampling instant, the time interval corresponding to each sampling instant, the starting center of mass position, and the relational expression between the center of mass position and foot contact force at each sampling instant.

In some embodiments, the screening module 840 may be further configured to:

determine, for each sampling instant, a target constraint relationship between the center of mass position variation coefficient and a foothold at each sampling instant according to a foot in contact with a contact surface at each sampling instant, a body pose of the legged robot at each sampling instant, and the spatial foothold constraint; and screen out the target center of mass position variation coefficient and target foothold that satisfy the target constraint relationship corresponding to each sampling instant and the variation relationship between the foot contact force at each sampling instant and the center of mass position variation coefficient.

In some embodiments, the screening module 840 may be further configured to:

obtain, under the restrictions of the constraint set, multiple sets of candidate results satisfying the variation relationship, each set of candidate result including a center of mass position variation coefficient and a foothold; and minimize a target function according to the multiple sets of candidate results to determine a target result from the multiple sets of candidate results, the target function being a quadratic term constructed according to a relevant quantity of the candidate result.

In some embodiments, the target function includes at least one of the following:

a quadratic term relevant to a foot contact force variation in the motion path;

a quadratic term of a center of mass position variation in the motion path;

a quadratic term of a difference between an ending center of mass position corresponding to the spatial path ending point in the center of mass state data and a center of mass position corresponding to the spatial path ending point in the candidate result;

a quadratic term of a difference between an ending center of mass velocity at the spatial path ending point in the center of mass state data and a center of mass velocity at the spatial path ending point in the candidate result; and a quadratic term of a difference between an ending center of mass acceleration at the spatial path ending point in the center of mass state data and a center of mass acceleration at the spatial path ending point in the candidate result.

In some embodiments, the constraint set further includes at least one of the following:

a frictional force constraint for restricting a frictional force between a foot for standing and the contact surface, the frictional force between the foot for standing and the contact surface being determined according to a foot contact force and a friction coefficient; and a contact force constraint for restricting a component of the foot contact force in a normal direction to be less than or equal to a contact force upper limit.

In some embodiments, the first determination module 820 may be further configured to:

collect a three-dimensional point cloud image of a current environment of the legged robot; and determine a candidate foothold corresponding to a foot in contact with the contact surface each time from the three-dimensional point cloud image according to the foot of the legged robot in contact with the contact surface each time in the motion path.

In some embodiments, the third determination module 850 may be further configured to:

determine a center of mass position of the legged robot at any instant according to the target center of mass position variation coefficient; and determine a joint torque of the legged robot at any instant according to the center of mass position of the legged robot at any instant and the target foothold.

The legged robot motion control apparatus 800 shown in FIG. 8 may further be configured to implement any legged robot motion control method described above, and will not be elaborated herein.

Based on the same inventive concept, some embodiments also provide a legged robot motion control device. The legged robot motion control device may be configured to realize functions of the legged robot 110 described above, or realize functions of the control device 120.

Figure 9:
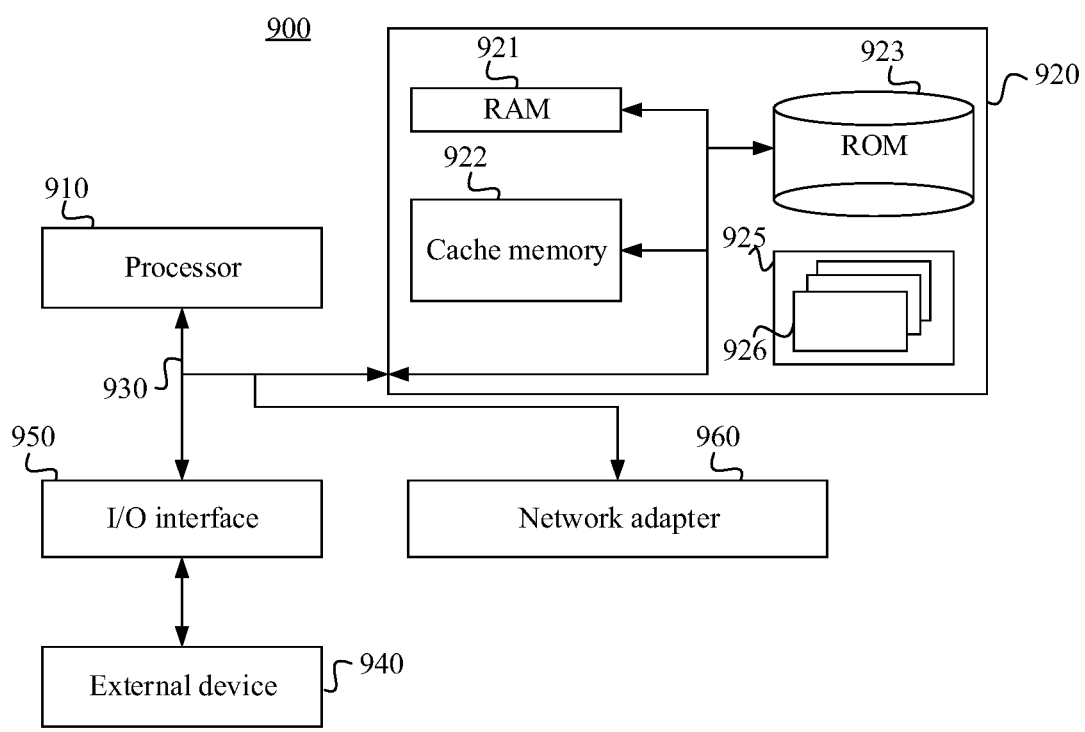
FIG. 9 is a schematic structural diagram of a legged robot motion control device according to some embodiments.

FIG. 9 is a schematic structural diagram of a legged robot motion control device according to some embodiments. A computer device 900 in FIG. 9 is represented in form of a general-purpose computer device. The computer device 900 may include, but not limited to, the following components: at least one processor 910, at least one memory 920, and a bus 930 that connects different system components (including the processor 910 and the memory 920).

The bus 930 represents one or more of several types of bus structures, including a memory bus or a memory controller, a peripheral bus, a processor, or a local bus using any bus structure among various bus structures.

The memory 920 may include a readable medium in a form a volatile memory, such as a random access memory (RAM) 921 and/or a cache memory 922, and may further include a read-only memory (ROM) 923. The memory 920 may further include a program/utility 926 having a set of (at least one) program modules 925. Such program modules 925 include, but are not limited to: an operating system, one or more application programs, other program modules, and program data, and each or a combination of these examples may include implementation of a network environment. The processor 910 is configured to execute program instructions, etc., stored in the memory 920 to implement the legged robot motion control method described below.

The computer device 900 may communicate with one or more external devices 940 (such as a keyboard, a pointing device, and the like), may alternatively communicate with a plurality of devices that enable a terminal to interact with the computer device 900, and/or communicate with any device (such as router or a modem) that enables the computer device 900 to communicate with one or more other devices. Such communication may be performed by using an input/output (I/O) interface 950. In addition, the computer device 900 may further communicate with one or more networks (for example, a local area network (LAN), a wide area network (WAN), and/or a public network, such as Internet) by using a network interface controller 960. As shown in the figure, the network adapter 960 communicates with other modules configured to the computer device 900 through the bus 930 It is to be understood that, although not shown in FIG. 9, other hardware and/or software modules may be used in combination with the computer device 900, including, but not limited to: micro code, a device driver, a redundancy processor, an external disk drive array, a RAID system, a tape drive, a data backup storage system, and the like.

In some embodiments, a variation relationship between a center of mass position variation coefficient and a foot contact force is determined according to center of mass state data of a legged robot corresponding to a spatial path starting point and a spatial path ending point, a target center of mass position variation coefficient and target foothold of the legged robot are determined by use of a constraint set and the variation relationship, and a center of mass position of the legged robot at each instant may further be determined. A spatial foothold constraint on the legged robot is considered to determine the target center of mass position variation coefficient and the target foothold, so that both the center of mass position determined based on the target center of mass position variation coefficient and the target foothold satisfy the spatial foothold constraint, namely both the determined center of mass position and the target foothold are actually reachable for the legged robot. Therefore, the determined center of mass position of the legged robot conforms better to an actual motion process of the legged robot, and the adaptability of the determined center of mass position is improved. In addition, in some embodiments, a center of mass motion trajectory of the legged robot may be generated automatically, and a foothold of the legged robot may be selected automatically, so that the legged robot is smarter.

Based on the same inventive concept, some embodiments provide a non-transitory computer-readable storage medium, storing computer instructions, the computer instructions, when run on a computer, causing the computer to perform the legged robot motion control method described above.

Based on the same inventive concept, some embodiments further provide a computer program product. The computer program product includes computer instructions, the computer instructions are stored in a computer-readable storage medium. A processor of a computer device reads the computer instructions from the computer-readable storage medium and executes the computer instructions to cause the computer device to perform any legged robot motion control method described above.

A person skilled in the art should understand that the embodiments may be provided as a method, a system, or a computer program product. Therefore, the disclosure may be in a form of complete hardware embodiments, complete software embodiments, or combination of software and hardware. Moreover, a form of a computer program product that is implemented on one or more computer-usable storage media (including but not limited to a disk memory, a CD-ROM, an optical memory, and the like) that include computer-usable program code may be used.

A person skilled in the art may make various modifications and variations to the disclosure without departing from the spirit and scope of the disclosure. In this case, if the modifications and variations made to the disclosure fall within the scope of the claims and equivalent technologies thereof, the disclosure is intended to include these modifications and variations.

What is claimed is:

1. A legged robot motion control method, performed by at least one processor and comprising:
   acquiring center of mass state data corresponding to a spatial path starting point and spatial path ending point of a motion path;
   determining a candidate foothold of each foot in the motion path based on the spatial path starting point and the spatial path ending point;
   determining a variation relationship between a center of mass position variation coefficient and a foot contact force based on the center of mass state data;
   screening out, under restrictions of a constraint set, a target center of mass position variation coefficient and target foothold that satisfy the variation relationship, the constraint set comprising a spatial foothold constraint;
   determining a target motion control parameter according to the target center of mass position variation coefficient and the target foothold; and
   controlling a legged robot based on the target motion control parameter to move according to the motion path.

2. The legged robot motion control method according to claim 1, wherein the center of mass state data comprises a starting center of mass position corresponding to the spatial path starting point, and the determining a variation relationship comprises:
   obtaining a movement duration needed by the legged robot to complete the motion path;
   determining multiple sampling instants from the movement duration, and determining a time interval between each sampling instant and an instant corresponding to the spatial path starting point; and
   obtaining, for each sampling instant, a variation relationship between the center of mass position variation coefficient and a foot contact force at each sampling instant according to the time interval corresponding to each sampling instant, the starting center of mass position, and a relational expression between a center of mass position and foot contact force at each sampling instant.

3. The legged robot motion control method according to claim 2, wherein the obtaining, for each sampling instant, a variation relationship comprises:
   determining a center of mass angular momentum at each sampling instant according to a body pose at each sampling instant; and
   obtaining the variation relationship between the center of mass position variation coefficient and the foot contact force at each sampling instant according to the center of mass angular momentum at each sampling instant, the time interval corresponding to each sampling instant, the starting center of mass position, and the relational expression between the center of mass position and foot contact force at each sampling instant.

4. The legged robot motion control method according to claim 2, wherein the screening comprises:
   determining, for each sampling instant, a target constraint relationship between the center of mass position variation coefficient and a foothold at each sampling instant according to a foot in contact with a contact surface at each sampling instant, a body pose of the legged robot at each sampling instant, and the spatial foothold constraint; and
   screening out the target center of mass position variation coefficient and target foothold that satisfy the target constraint relationship corresponding to each sampling instant and the variation relationship between the foot contact force at each sampling instant and the center of mass position variation coefficient.

5. The legged robot motion control method according to claim 1, wherein the screening comprises:
   obtaining, under the restrictions of the constraint set, multiple sets of candidate results satisfying the variation relationship, each set of candidate result comprising a center of mass position variation coefficient and a foothold; and
   minimizing a target function according to the multiple sets of candidate results to determine a target result from the multiple sets of candidate results, the target function being a quadratic term constructed according to a relevant quantity of the candidate result.

6. The legged robot motion control method according to claim 5, wherein the target function comprises at least one of the following:
   a quadratic term relevant to a foot contact force variation in the motion path;
   a quadratic term of a center of mass position variation in the motion path;
   a quadratic term of a difference between an ending center of mass position corresponding to the spatial path ending point in the center of mass state data and a center of mass position corresponding to the spatial path ending point in the candidate result;

a quadratic term of a difference between an ending center of mass velocity at the spatial path ending point in the center of mass state data and a center of mass velocity at the spatial path ending point in the candidate result; and a quadratic term of a difference between an ending center of mass acceleration at the spatial path ending point in the center of mass state data and a center of mass acceleration at the spatial path ending point in the candidate result.

7. The legged robot motion control method according to claim 1, wherein the constraint set further comprises at least one of the following:

a frictional force constraint for restricting a frictional force between a foot for standing and the contact surface, the frictional force between the foot for standing and the contact surface being determined according to a foot contact force and a friction coefficient; and a contact force constraint for restricting a component of the foot contact force in a normal direction to be less than or equal to a contact force upper limit.

8. The legged robot motion control method according to claim 1, wherein the determining a candidate foothold comprises:

collecting a three-dimensional point cloud image of a current environment of the legged robot; and determining a candidate foothold corresponding to a foot in contact with the contact surface each time from the three-dimensional point cloud image according to the foot of the legged robot in contact with the contact surface each time in the motion path.

9. The legged robot motion control method according to claim 1, wherein the determining a target motion control parameter comprises:

determining a center of mass position of the legged robot at any instant according to the target center of mass position variation coefficient; and determining a joint torque of the legged robot at any instant according to the center of mass position of the legged robot at any instant and the target foothold.

10. A legged robot motion control apparatus, comprising:

at least one memory configured to store program code; and at least one processor configured to read the program code and operate as instructed by the program code, the program code comprising:

acquisition code configured to cause the at least one processor to acquire a center of mass state data corresponding to a spatial path starting point and spatial path ending point of a motion path;

first determination code configured to cause the at least one processor to determine a candidate foothold of each foot in the motion path based on the spatial path starting point and the spatial path ending point;

second determination code configured to cause the at least one processor to determine a variation relationship between a center of mass position variation coefficient and a foot contact force based on the center of mass state data;

screening code configured to cause the at least one processor to screen out, under restrictions of a constraint set, a target center of mass position variation coefficient and target foothold that satisfy the variation relationship, the constraint set comprising a spatial foothold constraint;

third determination code configured to cause the at least one processor to determine a target motion control parameter according to the target center of mass position variation coefficient and the target foothold; and control code configured to cause the at least one processor to control a legged robot based on the target motion control parameter to move according to the motion path.

11. The legged robot motion control apparatus according to claim 10, wherein the center of mass state data comprises a starting center of mass position corresponding to the spatial path starting point, and the second determination code is further configured to cause the at least one processor to:

obtain a movement duration needed by the legged robot to complete the motion path;

determine multiple sampling instants from the movement duration, and determine a time interval between each sampling instant and an instant corresponding to the spatial path starting point; and obtain, for each sampling instant, a variation relationship between the center of mass position variation coefficient and a foot contact force at each sampling instant according to the time interval corresponding to each sampling instant, the starting center of mass position, and a relational expression between a center of mass position and foot contact force at each sampling instant.

12. The legged robot motion control apparatus according to claim 11, wherein the second determination code is further configured to cause the at least one processor to:

determine a center of mass angular momentum at each sampling instant according to a body pose at each sampling instant; and obtain the variation relationship between the center of mass position variation coefficient and the foot contact force at each sampling instant according to the center of mass angular momentum at each sampling instant, the time interval corresponding to each sampling instant, the starting center of mass position, and the relational expression between the center of mass position and foot contact force at each sampling instant.

13. The legged robot motion control apparatus according to claim 11, wherein the screening code is further configured to cause the at least one processor to:

determine, for each sampling instant, a target constraint relationship between the center of mass position variation coefficient and a foothold at each sampling instant according to a foot in contact with a contact surface at each sampling instant, a body pose of the legged robot at each sampling instant, and the spatial foothold constraint; and screen out the target center of mass position variation coefficient and target foothold that satisfy the target constraint relationship corresponding to each sampling instant and the variation relationship between the foot contact force at each sampling instant and the center of mass position variation coefficient.

14. The legged robot motion control apparatus according to claim 10, wherein the screening code is further configured to cause the at least one processor to:

obtain, under the restrictions of the constraint set, multiple sets of candidate results satisfying the variation relationship, each set of candidate result comprising a center of mass position variation coefficient and a foothold; and minimize a target function according to the multiple sets of candidate results to determine a target result from the multiple sets of candidate results, the target function being a quadratic term constructed according to a relevant quantity of the candidate result.

15. The legged robot motion control apparatus according to claim 14, wherein the target function comprises at least one of the following:

a quadratic term relevant to a foot contact force variation in the motion path;

a quadratic term of a center of mass position variation in the motion path;

a quadratic term of a difference between an ending center of mass position corresponding to the spatial path ending point in the center of mass state data and a center of mass position corresponding to the spatial path ending point in the candidate result;

a quadratic term of a difference between an ending center of mass velocity at the spatial path ending point in the center of mass state data and a center of mass velocity at the spatial path ending point in the candidate result; and a quadratic term of a difference between an ending center of mass acceleration at the spatial path ending point in the center of mass state data and a center of mass acceleration at the spatial path ending point in the candidate result.

16. The legged robot motion control apparatus according to claim 1, wherein the constraint set further comprises at least one of the following:

a frictional force constraint for restricting a frictional force between a foot for standing and the contact surface, the frictional force between the foot for standing and the contact surface being determined according to a foot contact force and a friction coefficient; and a contact force constraint for restricting a component of the foot contact force in a normal direction to be less than or equal to a contact force upper limit.

17. The legged robot motion control apparatus according to claim 10, wherein the first determination code is further configured to cause the at least one processor to:

collect a three-dimensional point cloud image of a current environment of the legged robot; and determine a candidate foothold corresponding to a foot in contact with the contact surface each time from the three-dimensional point cloud image according to the foot of the legged robot in contact with the contact surface each time in the motion path.

18. The legged robot motion control apparatus according to claim 10, wherein the third determination code is further configured to cause the at least one processor to:

determine a center of mass position of the legged robot at any instant according to the target center of mass position variation coefficient; and determine a joint torque of the legged robot at any instant according to the center of mass position of the legged robot at any instant and the target foothold.

19. A non-transitory computer-readable storage medium, storing computer code that when executed by at least one processor causes the at least one processor to:

acquire center of mass state data corresponding to a spatial path starting point and spatial path ending point of a motion path;

determine a candidate foothold of each foot in the motion path based on the spatial path starting point and the spatial path ending point;

determine a variation relationship between a center of mass position variation coefficient and a foot contact force based on the center of mass state data;

screen out, under restrictions of a constraint set, a target center of mass position variation coefficient and target foothold that satisfy the variation relationship, the constraint set comprising a spatial foothold constraint;

determine a target motion control parameter according to the target center of mass position variation coefficient and the target foothold; and control a legged robot based on the target motion control parameter to move according to the motion path.

20. The non-transitory computer-readable storage medium according to claim 19, wherein the center of mass state data comprises a starting center of mass position corresponding to the spatial path starting point, and the determine a variation relationship comprises:

obtaining a movement duration needed by the legged robot to complete the motion path;

determining multiple sampling instants from the movement duration, and determining a time interval between each sampling instant and an instant corresponding to the spatial path starting point; and obtaining, for each sampling instant, a variation relationship between the center of mass position variation coefficient and a foot contact force at each sampling instant according to the time interval corresponding to each sampling instant, the starting center of mass position, and a relational expression between a center of mass position and foot contact force at each sampling instant.

* * * * *